(12) United States Patent
Rueter et al.

(10) Patent No.: US 7,632,774 B2
(45) Date of Patent: Dec. 15, 2009

(54) METHOD FOR MANUFACTURING SUPPORTED NANOCATALYSTS HAVING AN ACID-FUNCTIONALIZED SUPPORT

(75) Inventors: Michael A. Rueter, Plymouth Meeting, PA (US); Sukesh Parasher, Lawrenceville, NJ (US); Cheng Zhang, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 558 days.

(21) Appl. No.: 11/393,334

(22) Filed: Mar. 30, 2006

(65) Prior Publication Data

US 2007/0231248 A1    Oct. 4, 2007

(51) Int. Cl.
*B01J 31/16* (2006.01)
*B01J 21/00* (2006.01)
*B01J 23/00* (2006.01)
*B01J 27/053* (2006.01)
*C01B 15/01* (2006.01)

(52) U.S. Cl. .................. 502/173; 502/217; 502/439; 423/584

(58) Field of Classification Search ............. 502/173, 502/217, 439; 423/584
See application file for complete search history.

(56) References Cited

U.S. PATENT DOCUMENTS

| | | | |
|---|---|---|---|
| 3,850,843 A | 11/1974 | Kunugi et al. | 502/169 |
| 3,907,852 A | 9/1975 | Oswald et al. | |
| 4,071,494 A | 1/1978 | Gaylord | |
| 4,083,803 A | 4/1978 | Oswald et al. | 508/158 |
| 4,128,627 A | 12/1978 | Dyer et al. | 423/584 |
| 4,148,750 A | 4/1979 | Pine | 502/26 |
| 4,169,014 A | 9/1979 | Goldberg | |
| 4,279,883 A | 7/1981 | Izumi et al. | 423/584 |
| 4,313,806 A | 2/1982 | Dalton, Jr. et al. | 205/724 |
| 4,335,092 A | 6/1982 | Dalton, Jr. et al. | 423/584 |
| 4,336,238 A | 6/1982 | Dalton, Jr. et al. | 423/584 |
| 4,336,239 A | 6/1982 | Dalton, Jr. et al. | 423/584 |
| 4,336,240 A | 6/1982 | Moseley et al. | 423/584 |
| 4,347,231 A | 8/1982 | Michaelson | 423/584 |
| 4,347,232 A | 8/1982 | Michaelson | 423/584 |
| 4,366,085 A | 12/1982 | Ikegami et al. | 502/155 |
| 4,369,128 A | 1/1983 | Moseley et al. | 502/169 |
| 4,379,778 A | 4/1983 | Dalton, Jr. et al. | 423/584 |
| 4,409,365 A | 10/1983 | Coran | |
| 4,652,311 A | 3/1987 | Gulla et al. | |
| 4,661,337 A | 4/1987 | Brill | 423/584 |
| 4,681,751 A | 7/1987 | Gosser | 423/584 |
| 4,826,795 A | 5/1989 | Kitson et al. | 502/184 |
| 4,832,938 A | 5/1989 | Gosser et al. | 423/584 |
| 4,889,705 A | 12/1989 | Gosser | 423/584 |
| 4,996,039 A | 2/1991 | Pralus et al. | 423/584 |
| 5,128,114 A | 7/1992 | Schwartz | 423/335 |
| 5,132,099 A | 7/1992 | Hiramatsu et al. | 423/584 |
| 5,180,573 A | 1/1993 | Hiramatsu et al. | 423/584 |
| 5,225,282 A | 7/1993 | Chagnon | |
| 5,236,692 A | 8/1993 | Nagashima et al. | 423/584 |
| 5,320,821 A | 6/1994 | Nagashima et al. | 423/584 |
| 5,338,531 A | 8/1994 | Chuang et al. | 423/584 |
| 5,352,645 A | 10/1994 | Schwartz | 502/262 |
| 5,378,450 A | 1/1995 | Tomita et al. | 423/584 |
| 5,393,724 A | 2/1995 | Okajima et al. | 502/402 |
| 5,480,629 A | 1/1996 | Thompson et al. | 423/584 |
| 5,496,532 A | 3/1996 | Monzen et al. | 423/584 |
| 5,554,793 A | 9/1996 | Hartwell et al. | |
| 5,624,711 A | 4/1997 | Sundberg | |
| 5,670,580 A | 9/1997 | Tazaki et al. | 525/240 |
| 5,846,895 A | 12/1998 | Gila et al. | 502/107 |
| 5,846,898 A | 12/1998 | Chuang et al. | 502/181 |
| 5,925,588 A | 7/1999 | Chuang et al. | 502/181 |
| 5,961,948 A | 10/1999 | Wanngård | 423/584 |
| 5,965,101 A | 10/1999 | Goto et al. | 423/584 |
| 5,972,305 A | 10/1999 | Park et al. | 423/587 |
| 5,976,486 A | 11/1999 | Thompson et al. | 423/584 |
| 5,998,328 A | 12/1999 | Dawes et al. | 502/182 |
| 6,054,507 A | 4/2000 | Funaki et al. | 523/210 |
| 6,090,858 A | 7/2000 | El-Sayed | 516/97 |
| 6,106,797 A | 8/2000 | Muller et al. | 423/584 |
| 6,117,409 A | 9/2000 | Bertsch-Frank et al. | 423/584 |
| 6,127,307 A | 10/2000 | Muller et al. | 502/162 |
| 6,159,267 A | 12/2000 | Hampden-Smith et al. | 75/252 |

(Continued)

FOREIGN PATENT DOCUMENTS

EP    0 978 316    2/2000

(Continued)

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

(Continued)

*Primary Examiner*—Timothy C Vanoy
*Assistant Examiner*—Daniel Berns
(74) *Attorney, Agent, or Firm*—Workman Nydegger

(57) ABSTRACT

Supported catalysts include an inorganic solid support such as silica that is functionalized to have inorganic acid functional groups attached thereto. The functionalization of the support material is optimized by (i) limiting the amount of water present during the functionalization reaction, (ii) using a concentrated mineral acid or derivative thereof, and/or (iii) increasing the reaction temperature and/or reaction pressure. The acid-functionalized support material serves as a support for a metal nanoparticle catalyst. The nanocatalyst particles are preferably bonded to the support material through an organic molecule, oligomer, or polymer having functional groups that can bind to both the nanocatalyst particles and to the support material. The supported catalysts can advantageously be used for the direct synthesis of hydrogen peroxide from hydrogen and oxygen feed streams.

33 Claims, No Drawings

U.S. PATENT DOCUMENTS

| | | | |
|---|---|---|---|
| 6,168,775 B1 | 1/2001 | Zhou et al. | 423/584 |
| 6,194,338 B1 | 2/2001 | Andolfatto et al. | 502/101 |
| 6,210,651 B1 | 4/2001 | Nystrom et al. | 423/584 |
| 6,235,427 B1 * | 5/2001 | Idota et al. | 429/218.1 |
| 6,284,213 B1 | 9/2001 | Paparatto et al. | 423/403 |
| 6,297,180 B1 | 10/2001 | Maier | |
| 6,299,852 B1 | 10/2001 | Nystrom et al. | 423/584 |
| 6,300,456 B1 | 10/2001 | Musa | |
| 6,342,191 B1 | 1/2002 | Kepner et al. | 423/210 |
| 6,346,228 B1 * | 2/2002 | Choudhary et al. | 423/584 |
| 6,455,594 B1 | 9/2002 | Tsuji | |
| 6,462,095 B1 | 10/2002 | Bönsel et al. | |
| 6,518,217 B2 | 2/2003 | Xing et al. | 502/230 |
| 6,528,683 B1 | 3/2003 | Heidemann et al. | 562/542 |
| 6,534,661 B1 | 3/2003 | Zhou et al. | 549/531 |
| 6,551,960 B1 | 4/2003 | Laine et al. | 502/327 |
| 6,630,118 B2 | 10/2003 | Paparatto et al. | 423/584 |
| 6,649,140 B2 | 11/2003 | Paparatto et al. | 423/584 |
| 6,676,919 B1 | 1/2004 | Fischer et al. | 423/584 |
| 6,686,308 B2 | 2/2004 | Mao et al. | |
| 6,689,820 B2 | 2/2004 | Muranaka | |
| 6,709,824 B2 | 3/2004 | Jacobsen et al. | |
| 6,740,615 B2 | 5/2004 | Zhou | 502/29 |
| 6,746,597 B2 | 6/2004 | Zhou et al. | 208/138 |
| 6,872,681 B2 | 3/2005 | Niu et al. | 502/101 |
| 7,011,807 B2 | 3/2006 | Zhou et al. | 423/584 |
| 7,045,481 B1 | 5/2006 | Parasher et al. | 502/150 |
| 2003/0092565 A1 | 5/2003 | Chaudhari | |
| 2003/0215383 A1 | 11/2003 | Escrig et al. | 423/584 |
| 2004/0013601 A1 | 1/2004 | Butz et al. | 423/584 |
| 2004/0037770 A1 | 2/2004 | Fischer et al. | 423/584 |
| 2004/0081611 A1 | 4/2004 | Muller et al. | 423/584 |
| 2004/0147618 A1 | 7/2004 | Lee et al. | |
| 2004/0184983 A1 | 9/2004 | Paparatto et al. | 423/584 |
| 2004/0241502 A1 | 12/2004 | Chung et al. | 428/702 |
| 2005/0283003 A1 | 12/2005 | Spudich | |
| 2006/0000758 A1 | 1/2006 | Wormsbecher | |
| 2006/0079396 A1 | 4/2006 | Saito | |

FOREIGN PATENT DOCUMENTS

| | | |
|---|---|---|
| JP | 10324507 | 12/1998 |
| JP | 10330103 | 12/1998 |
| WO | WO 02/83550 | 10/2002 |

OTHER PUBLICATIONS

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Sohn, et al., "Acidic Properties and Catalytic Activity of Titanium Sulfate Supported on TiO2", Bull, Korean Chem. Soc., vol. 25, No. 5, 2004.

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

* cited by examiner

METHOD FOR MANUFACTURING SUPPORTED NANOCATALYSTS HAVING AN ACID-FUNCTIONALIZED SUPPORT

BACKGROUND OF THE INVENTION

1. The Field of the Invention

The present invention relates generally to supported catalysts and methods for making and using such catalysts (e.g., in the direct synthesis of hydrogen peroxide). The support material is functionalized with a mineral acid (e.g., concentrated sulfuric acid) or a derivative thereof to improve the bonding of the catalyst to the support.

2. The Related Technology

Hydrogen peroxide is a commercially important product which is widely used in the textile industry, paper industry, and chemical industry as a bleaching agent, biocide, and chemical reagent. Traditionally, hydrogen peroxide has been manufactured through a process which includes multiple oxidation and reduction steps using alkylanthraquinones. This process is complicated and expensive because of the many steps involved, the large volumes of reagents, the relatively high cost of intermediates, and the production of inactive by-products.

Recently, efforts have been made to develop an alternative process whereby hydrogen peroxide is directly synthesized from hydrogen and oxygen using precious metal catalysts. The direct synthesis of hydrogen peroxide offers significant economic advantages because it avoids making intermediate products and does not need the use of reagents such as alkylanthraquinones.

One important aspect of a direct synthesis process is the catalyst, which must be able to selectively convert hydrogen and oxygen to hydrogen peroxide, with minimal production of water, a competing by-product that is thermodynamically favored over hydrogen peroxide. In general, catalysts for the direct synthesis reaction use palladium or a combination of palladium and platinum, as the active catalyst. These catalysts are generally used in the form of small particles dispersed on a solid catalyst support.

While catalysts formed from small particulates can advantageously have high activity, small particulates present a problem with attrition. Because of the high cost of the active catalyst metals, the metals need to be used efficiently and should be recoverable. In some cases, metal that separates from the support can be recovered in expensive filtration systems. However, many of the metal particles that separate from the support are too fine to be recovered in the filtration process and are thus unrecoverable. Modifying the support and/or the catalyst particles to reduce attrition is very difficult because the task must be accomplished without significantly effecting catalyst performance.

BRIEF SUMMARY OF THE INVENTION

The present invention is directed to an improved supported catalyst manufactured from a solid support material functionalized to have inorganic acid functional groups. The reaction conditions for functionalizing the support are optimized to improve the number of functional groups on the surface of the support. Conditions that have been found to significantly improve performance of the catalysts include 1) functionalizing the support in the presence of little or no water, 2) functionalizing the support with concentrated mineral acids or mineral acid derivatives, and/or 3) functionalizing the support at high temperatures and/or pressures.

The method for manufacturing the supported catalysts of the present invention generally includes (i) providing a catalyst support material; (ii) providing an acid treatment composition comprising a mineral acid or a derivative thereof; (iii) functionalizing the surface of the support material by mixing the acid treatment composition with the catalyst support material and reacting the support material with the mineral acid or derivative; and (iv) supporting a plurality of catalyst particles on the acid-functionalized support material. The reaction conditions of step (iii) are optimized to produce a catalyst with a greater number of acid groups on the surface of the support while causing minimal degradation of the support material and/or improved catalyst performance in direct hydrogen peroxide synthesis.

In a preferred embodiment, the reaction conditions for acid-functionalizing the support are optimized by limiting the amount of water present during the reaction between the mineral acid and the support material. In a preferred embodiment, the amount of water in the acid treatment composition during the reaction is less than about 20% by weight, more preferably less than about 15%, even more preferably less than about 10%, and most preferably less than about 5%. The lower amounts of water beneficially result in an increased number of acid functional groups on the surface of the support. This improvement is likely due in part to a reduction in hydrolysis reactions that are favored at higher water concentrations.

The amount of water in the acid treatment composition during the reaction between the mineral acid and the support material can be greatly affected by the amount of water present in the support material prior to mixing. Typically, the support material is washed prior to being functionalized. Water remaining in the support after washing is typically available for mixing with the acid treatment composition. Since residual water in the support can add greater than 20%-30% to the acid treatment composition, the support material as used in the present invention is advantageously dried before use and/or not washed with water.

The reaction conditions for acid-functionalizing the support can also be optimized by using a concentrated mineral acid. In a preferred embodiment, the acid treatment composition comprises at least about 80% by weight of the mineral acid or a mineral acid derivative, more preferably at least about 90%, and most preferably at least about 95%. In a preferred embodiment, the mineral acid comprises sulfuric acid or a derivative of sulfuric acid.

Support materials functionalized with sulfonic groups have been found to be superior supports for catalysts and in particular for direct synthesis hydrogen peroxide catalysts. The catalysts made using the support materials of the present invention have shown significantly improved selectivity for directly synthesizing hydrogen peroxide from oxygen and hydrogen.

In an alternative embodiment, or in addition to the foregoing optimization steps, the acid-functionalization can be optimized by increasing the reaction temperature and/or reaction pressure. In a preferred embodiment, the reaction temperature during acid-functionalization is at least about 100° C., more preferably at least about 125° C., even more preferably at least about 150° C., and most preferably at least about 175° C. In a preferred embodiment, the reaction pressure is at least about 1.1 MPa.

A catalyst material, such as active noble metal particles, is supported on the functionalized support material. The acid-functionalized groups provide reactive sites where catalyst atoms can be attached or bonded to the support. The optimized functionalization of the support of the present invention has been found to improve the concentration at which a colloidal solution can be deposited on the support material. In one exemplary embodiment of the present invention, colloidal catalyst particles are deposited on the acid-functionalized support by applying a colloidal solution having a metal concentration of at least about 250 ppm, and more preferably at least about 300 ppm.

The novel supported catalysts of the present invention are particularly advantageous for the direct synthesis of hydrogen peroxide. Hydrogen peroxide catalysts manufactured according to the present invention have shown improved selectivity for hydrogen peroxide and less selectivity for water. It has been found that the improved benefits of acid-functionalization carried out according to the present invention can be observed at higher metal loadings than acid-functionalization performed without the optimization disclosed herein. In one embodiment, the metal loading on the support of the present invention is at least about 0.2% by weight, and more preferably at least about 0.3% by weight.

While any catalyst material can be supported on the support material of the present invention, the optimized acid-functionalization of the present invention is particularly beneficial for supported catalysts manufactured using an organic dispersing agent (e.g., an organic molecule, oligomer, or polymer). The organic dispersing agent advantageously includes one or more functional groups that can bind with the metal particles and one or more functional groups that can bind to the support material, preferably the acidic functional groups added according to the invention.

The present invention is particularly advantageous when used with metal oxides for the support material. Metal oxides often lack adequate bonding sites for bonding a catalyst as compared with other support materials. Providing acid functionalization compensates for the initial lack of bonding sites. Examples of suitable metal oxides include silica, alumina, natural and synthetic zeolites, among others.

These and other advantages and features of the present invention will become more fully apparent from the following description and appended claims as set forth hereinafter.

DETAILED DESCRIPTION OF EXEMPLARY EMBODIMENTS

The present invention is directed to the manufacture of novel supported catalysts. The novel catalysts include a solid support material that is functionalized to have inorganic acid functional groups. The functionalization of the support material is optimized by limiting the amount of water present during the functionalization reaction, using a concentrated mineral acid or mineral acid derivative, and/or increasing the reaction temperature and/or pressure.

The acid-functionalized support material serves as a support for a metal nanoparticle catalyst. The nanocatalyst particles are preferably bonded to the support material through an organic molecule, oligomer, or polymer having functional groups that can bind to both the nanocatalyst particles and to the support material. The present invention is also directed to methods of using the supported catalysts to directly synthesize hydrogen peroxide from hydrogen and oxygen feed streams.

For purposes of this invention, the term "nanoparticles" or "nano-sized particles," means particles with a diameter of less than about 100 nanometers (nm).

I. Components Used to Manufacture Supported Catalysts and Intermediates

Supported catalysts according to the invention are typically manufactured using a support material such as a metal oxide, a mineral acid or a derivative thereof, a plurality of catalyst atoms, and an organic dispersing agent. As will be discussed more fully below, the support material is reacted with the mineral acid or derivative to form an acid-functionalized support material. A nanoparticle catalyst is then supported on the acid-functionalized support.

A. Support Materials

Any inorganic solid support material known to those skilled in the art as useful catalyst supports can be used as supports for the nanocatalyst particles of this invention. The support may be in a variety of physical forms. It may be either porous or non-porous. It may be a 3-dimensional structures such as a powder, granule, tablet, extrudate, or the like. Supports may also be in the form of a 2-dimensional structure such as a film, membrane, coating, or 3-dimensional structure having mainly 2-dimensional surfaces or 1-dimensional surfaces such as fibers.

In an exemplary embodiment, the support includes a metal oxide. Suitable support materials that comprise a metal oxide include, but are not limited to, silica, including silica gel, fused silica, fumed silica, quartz, and the like, alumina, kieselguhr, diatomaceous earth, bentonite, as well as the oxides of various other metals, alone or in combination. They also include the class of porous solids collectively known as zeolites, natural or synthetic, which have ordered pore structures. For purposes of this invention, the elements "silicon" and "aluminum" are considered metals, and silicon oxides and aluminum oxides are metal oxides.

In a preferred embodiment, the support material comprises a metal oxide, and the metal oxide component is greater than about 50% by weight of the support material, more preferably greater than about 75%, and even more preferably greater than about 90% by weight. In a most preferred embodiment, the metal oxide comprises at least about 90% silica gel by weight.

Typically, the support material includes hydroxyl or other functional groups on the surface of the support material that can be used to functionalize the support material with an inorganic acid. As discussed more fully below, in some cases, the surface of the support material is first activated such that the mineral acid will bond to the support material.

In an exemplary embodiment, the support material has a high surface area for supporting a dispersed catalyst material. In a preferred embodiment, the surface area is between about 50 m$^2$/g and about 1000 m$^2$/g. In a more preferred embodiment, the surface area is between about 100 m$^2$/g and about 500 m$^2$/g.

Another feature of preferred support material is its ability to be manufactured into almost any desired shape and/or size. Because the catalyst of the present invention can be made from metals or metal oxides such as silica and alumina, the catalyst can be shaped using methods known in the art. For example, metals and metal oxides can be manufactured into any size or shaped granules, beads, extrudates, spheres, powders, and similar shapes.

The support material can include additional components to give the support material desired properties and/or to assist forming the support material into a desired size or shape. Examples of other components include binders, lubricants, and extrusion aids.

B. Acid Treatment Compositions

The acid treatment composition preferably includes a mineral acid or a derivative thereof. The mineral acids are acids that have sulfonic groups, nitric groups, phosphonic groups, and the like, capable of reacting with the support material or a pre-functionalized intermediate thereof. For purposes of this invention, sulfonic groups, nitric groups, and phosphonic groups include functional groups that are derived from sulfuric acid, nitric acid, and phosphoric acid, respectively, so long as the derivative-based functional group is capable of bonding to the support or intermediate support. The term sulfonic group includes, but is not limited to, functional groups with an $SO_3$ group, whether in the ground state or in ionic form. $SO_3$ functional groups and derivatives thereof include sulfonates, sulfamates, sulfites, bisulfites, sulfonic acid, salts and esters of these, sulfonyl halides, and the like. The term "sulfonic group" shall also include sulfates and bisulfates. Nitric groups and phosphonic groups also include derivative-based functional groups corresponding to their respective acids.

Examples of suitable mineral acids include sulfuric acid, sulfamic acid, nitric acid, phosphoric acid, salts and esters of these, or the like. Alternatively, the acid can be a derivative of a mineral acid. Examples of suitable derivatives include organic compounds that have an inorganic acid group derived from a mineral acid. Such compounds include organic sulfonic acids such as para-toluene sulfonic acid (p-TSA), dodecylbenzene sulfonic acid, methane sulfonic acid, 2,4 dinitrobenzene sulfonic acid, 3 hydroxypropane-1-sulfonic acid, 6-aminotoluene-3-sulfonic acid, 2-amino-1-naphthalenesulfonic acid, diphenylamine-4-sulfonic acid, p-xylene-2-sulfonic acid, salts and esters of these, and similar compounds. Examples of nitric and phosphonic derivatives include nitrobenzene, 1,3-dinitrobenzene, 3-nitrobenzoic acid, phenylphosphinonic acid, phenylphosphonic acid, and the like.

The acid treatment composition can also include a solvent. Suitable solvents include organic solvents, water, or combinations thereof. In a preferred embodiment, the mineral acid in the acid treatment composition is highly concentrated. These solvents may be the same or different than the solvents described below that are used to manufacture the nanocatalyst particles.

C. Catalyst Atoms

The catalyst atoms that form the nanocatalyst particles of the present invention include one or more noble metals, base transition metals, rare earth metals, alkaline earth metals, earth metals or non-metals. In an exemplary embodiment, the catalyst atoms include at least one noble metal. Noble metals include platinum, palladium, iridium, gold, osmium, ruthenium, rhodium, and rhenium.

For direct synthesis of hydrogen peroxide, the catalysts are selected to provide optimal catalytic performance in a direct hydrogen peroxide manufacturing process. In an exemplary embodiment, the catalyst atoms include palladium, platinum or combinations thereof.

As described below, the catalyst atoms are added to an appropriate solvent or carrier to form a suspension or solution. Catalyst atoms can be added to a solution in elemental (i.e., metallic) or ionic form. Typically, the catalyst atoms are added in ionic form so as to more readily dissolve or disperse within the solvent or carrier.

Ionic metal atoms are typically added in the form of a metal salt. Examples of suitable ionic forms include metal halides, nitrates or other appropriate salts that are readily soluble in a solvent or carrier. Other examples include metal phosphates, sulfates, tungstates, acetates, citrates, and glycolates.

Metal components that are compounds themselves, such as oxides, can be added to a liquid medium in the appropriate compound form, or may be in a different chemical form that is converted to the appropriate chemical form during nanoparticle formation.

D. Dispersing Agent

The dispersing agent is an organic molecule that can bond with atoms of the catalyst nanoparticles and optionally to the support material such that the dispersing agent tethers the nanocatalyst particles to the support material. Exemplary dispersing agents are able to interact and complex with catalyst atoms dissolved or dispersed within an appropriate solvent or carrier through various mechanisms, including ionic bonding, covalent bonding, van der Waals interaction/bonding, or hydrogen bonding. Dispersing agents within the scope of the invention include a variety of small organic molecules, as well as polymers and oligomers.

To provide bonding between the dispersing agent and the catalyst atoms, the dispersing agent includes one or more appropriate functional groups. Suitable functional groups for bonding the dispersing agent with the catalyst atoms include one or more of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The dispersing agent can be monofunctional, bifunctional, or polyfunctional.

Examples of suitable monofunctional dispersing agents include alcohols such as ethanol and propanol and carboxylic acids such as formic acid and acetic acid. Useful bifunctional dispersing agents include diacids such as oxalic acid, malonic acid, maleic acid, and the like; dialcohols such as ethylene glycol, propylene glycol, 1,3-propanediol, and the like; and hydroxy acids such as glycolic acid, lactic acid, and the like. Useful polyfunctional dispersing agents include sugars such as glucose, polyfunctional carboxylic acids such as citric acid, oxalic acid, hydroxy diacids, and the like.

Other useful dispersing agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Exemplary dispersing agents according to the invention also include polymers or oligomers, which can be natural or synthetic. In the case where the dispersing agent is an oligomer or polymer, the molecular weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the dispersing agent if they are readily soluble in solvents, carriers or vehicles and can complex with the catalyst atoms.

The molecular weight of the polymer or oligomer molecules may be selected to yield a dispersing agent having a desired number of functional groups per molecule. In general, the number of functional groups may range from 4 to 200 functional groups per molecule, preferably from about 8 to about 80 functional groups, and more preferably from about 10 to about 20 functional groups. In many cases, the number of functional groups within a polymer or oligomer at least approximately corresponds to the number of repeating units. It is also possible to reduce or minimize branching by selecting a polymer or oligomer having fewer repeating units, e.g., fewer than 20.

Suitable polymers and oligomers within the scope of the invention include, but are not limited to, polyacrylic acid, polyacrylates, polyvinylbenzoates, polyvinyl sulfate, polyvinyl sulfonates (including sulfonated styrene), polybisphenol carbonates, polybenzimidazoles, polypyridine, sulfonated polyethylene terephthalate. Other suitable polymers include polyvinyl alcohol, polyethylene glycol, polypropylene glycol, and the like.

E. Solvents and Carriers for Forming Nanocatalysts

A solvent or carrier can be used as a vehicle for the combining of the catalyst atoms (typically in the form of an ionic salt) and/or the dispersing agent. The solvent used to make the inventive precursor compositions may be an organic solvent, water or a combination thereof. Organic solvents that can be used include alcohols, ethers, glycols, ketones, aldehydes, nitrites, and the like.

Preferred solvents are liquids with sufficient polarity to dissolve the metal salts. These preferred solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the surface tension of the mixture, or to stabilize the nanoparticles.

The solvent for the nanoparticle components may be a neat solvent, but it is preferable to use an acidic solution, as acids aid in the dissolution of the nanoparticle components. The solution may be acidified with any suitable acid, including organic and inorganic acids. Preferred acids include mineral acids such as sulfuric, phosphoric, hydrochloric, nitric, and the like, or combinations thereof. While it is possible to use an acid in a wide range of concentrations, it is generally only necessary to use relatively dilute solutions to accomplish a desired solubility enhancement.

II. Methods of Making Supported Catalyst

The process for manufacturing supported catalysts according to the present invention generally includes (i) functionalizing a support material with a mineral acid or mineral acid derivative and (ii) forming and/or depositing catalyst nanoparticles on the functionalized support. Optionally, the catalyst nanoparticles can be manufactured using an organic dispersing agent and the organic dispersing agent can anchor the catalyst nanoparticles to the support material.

A. Manufacturing Inorganic Acid-Functionalized Support Materials

The acid-functionalized support material is made by reacting an acid treatment composition with a support material. The acid treatment composition includes at least one mineral acid (e.g., $H_2SO_4$) or a derivative thereof. The acid treatment composition serves as a delivery mechanism for reacting the mineral acid with the support material. During the reaction, the acid group bonds to the support material such that the support material is acid-functionalized.

The reaction of the support material and the mineral acid is optimized to increase the functionalization and/or reduce the degradation of the support material during functionalization. Optimizing reaction conditions can include (i) limiting the amount of water in the acid treatment composition to less than about 20% water, (ii) carrying out the reaction at a temperature of at least 100° C. and/or (iii) using a concentrated acid.

In a preferred embodiment, the reaction conditions are optimized by limiting the amount of water present during the reaction of the mineral acid or derivative with the support material. In a preferred embodiment, the amount of water in the acid treatment composition during the reaction is less than about 20% by weight, more preferably less than about 15%, even more preferably less than about 10%, and most preferably less than about 5%. For purposes of the present invention the amount of water present during the reaction is calculated according to the water concentration at the outset of the reaction between the acid treatment composition and the support material. Thus, any water produced during the reaction (e.g., in a condensation reaction) is not included in the determination of the water concentration.

The amount of water present in the acid treatment composition during the reaction includes all sources of water regardless of whether the water enters the acid treatment composition before or after the acid treatment composition has been applied to the support material. For example, if water is present in the support material when the acid treatment composition is applied to the support, this water mixes with the acid treatment composition and is present during the process of acid functionalizing of the support.

The reaction conditions for acid-functionalizing the support can also be optimized by using a concentrated acid. In a preferred embodiment, the acid containing agent comprises at least about 80% by weight of at least one mineral acid or mineral acid derivative, more preferably at least about 85% by weight, more preferably at least about 90%, and most preferably at least about 95%. In a preferred embodiment, the mineral acid comprises concentrated sulfuric acid (i.e., containing less than about 20% by weight water).

In an alternative embodiment or in addition to the foregoing optimization steps, the acid-functionalization can be optimized by increasing the reaction temperature and/or reaction pressure. In a preferred embodiment, the reaction temperature during acid-functionalization is at least about 100° C., more preferably at least about 125° C., even more preferably at least about 150° C., and most preferably at least about 175° C. In a preferred embodiment, the reaction pressure is at least about 1.1 MPa.

Other treatments can precede or follow the acid treatment of the support material. Suitable other treatments include water soaks or washes, solvent soaks or washes, drying procedures, gas purges such as with an inert gas, and/or others. Where the support material is washed with water, the support material can be dried to eliminate or reduce the amount of water that will mix with the acid treatment composition.

The acid-functionalized support material can be created in a single step or, alternatively, in two or more steps. In a single-step process, the mineral acid is sufficiently reactive with the support material and the reaction conditions sufficiently severe such that the mineral acid will react and bond to the support material. An example of a mineral acid suitable for use in a single-step process is para-toluene sulfonic acid or concentrated sulfuric acid.

In an alternative embodiment, the acid-functionalized support material is manufactured in a two-step process. In this embodiment, the support material is first reacted with an activating agent to make the support more reactive to the mineral acid or derivative, thus forming an intermediate functionalized support material.

The activating agent can be any compound that will react with the surface of the support to make the surface of the support more reactive to a mineral acid. In an exemplary embodiment, the activating agent is a hydrogen halide, such as HF, HCl, or HBr. Typically, reacting the mineral acid (e.g., sulfuric acid) with the intermediate functionalized support results in the activating agent being lost from the intermediate support. Where the activating agent includes water, the water can be driven off prior to reacting the support with the mineral acid to achieve the optimization of the present invention. If the activating agent yields halide or other non-hydroxyl leaving groups, the reaction with acid will produce less water as a byproduct.

Once the inorganic acid functional groups have been bonded to the support material, the functionalized support can be washed to remove traces of unreacted chemicals. For example, the functionalized support can be washed with water or organic solvent.

Other optional treatment steps can also be performed on the acid-functionalized support. For example, the acid-functionalized support can be soaked in a solvent such as methanol, ethanol, or the like. Optionally the functionalized support can also be dried.

B. Depositing Nanocatalyst Particles on the Acid-Functionalized Support Material Any known method can be used to deposit nanocatalyst particles on the acid-functionalized support material of the present invention. In a preferred embodiment, nanocatalyst particles formed using an organic dispersing agent are deposited and/or formed on the support material. Preferably the organic dispersing agent can bond to the support material and the nanocatalyst particles to tether the nanocatalyst particles to the support material. In this embodiment, the nanocatalyst particles are generally formed by first dissolving the catalyst atoms and the dispersing agent in an appropriate solvent or carrier and allowing the catalyst atoms to recombine as a catalyst complex so as to form a solution or suspension. Nanoparticles can be formed before or after the dispersing agent is bonded to the support.

In one embodiment, dispersed catalyst nanoparticles form in the suspension, colloid, or solution. In an alternative embodiment, the dispersing agent facilitates the formation of nanoparticles as the active atoms are disposed on a support surface in one or more subsequent steps. Typically, active catalyst particles form in a reducing step. Suitable reducing techniques include bubbling hydrogen gas through the solution of dispersed catalyst atoms.

When forming catalyst nanoparticles, the catalyst atoms can be provided in any form so as to be soluble or dispersible in the solvent or carrier that is used to form the nanoparticles. For example, catalyst atoms can be provided as metal salts that are readily dissolvable in the solvent or carrier. It may be advantageous to use metal chlorides and nitrates, since metal chlorides and nitrates are typically more soluble than other metal salts. In an alternative embodiment, the metal can be provided in its nonionic (i.e. metal) form. In this embodiment, the solvent or carrier typically includes: an acid to help dissolve the metal.

The dispersing agent is added to the solvent or carrier in a manner so as to facilitate association of the dispersing agent with the catalyst atoms. Some dispersing agents may themselves be soluble in the solvent or carrier. In the case of dispersing agents that include carboxylic acid groups, it may be advantageous to form a metal salt of the acids (e.g., an alkali or alkaline earth metal salt). For example, polyacrylic acid can be provided as a sodium polyacrylate salt that is both readily soluble in aqueous solvent systems and able to react with catalyst metal salts to form a metal-polyacrylate complex which may be soluble, or which may form a suspension within the solvent or carrier.

The dispersing agent is reacted with the acid-functionalized support material to bond the dispersing agent to functional groups of the surface of the acid-functionalized support. It is currently believed that the dispersing agent primarily bonds to the support through the inorganic acid functional groups. However, it is also possible for the dispersing agent to bond to other functional groups on the metal oxide support, such as through hydroxyl groups or by an acid displacing a halide group on the support.

Those skilled in the art will also recognize that even where the dispersing agent bonds to the inorganic acid functional groups, there may be any number of remaining acid functional groups that are available to give the supported catalyst desired properties.

In one aspect of the invention, the dispersing agent is selected to have particular functional groups for bonding the dispersing agent to the acid-functionalized support material. For example, polyacrylic acid can be used for its carboxylic acid functional groups that can react with an inorganic acid group on the functionalized support surface.

The dispersing agent can be reacted with the support material before or after reacting the dispersing agent with the catalyst atoms to form nanoparticles. In some cases, as mentioned above, reacting the dispersing agent with the support material can facilitate the formation of nanoparticles.

III. Supported Catalysts

The supported catalysts of the present invention include an acid-functionalized support material and a plurality of supported active nanoparticles. Optionally a dispersing agent tethers the active nanoparticles to the support material to prevent leaching and/or agglomeration of the catalyst nanoparticles.

The functional groups of the dispersing agent bond to one or more of the atoms of the active nanoparticles and one or more functional groups on the surface of the acid-functionalized support material. In an exemplary embodiment, the dispersing agent bonds to the inorganic acid functional groups on the surface of a metal oxide support.

Metal loadings of the catalyst component on the support material can vary depending on the intended use of the supported catalyst. In a preferred embodiment, the metal loading is between about 0.01% and about 10% by weight, and more preferably between about 0.05% and about 5% by weight. These loading amounts are useful for catalyst for direct synthesis of hydrogen peroxide, for example. In many cases it can be advantageous to have metal loadings of at least about 0.2 wt % and more preferably at least about 0.3 wt %. The optimization of the acid functionalization of the support material according to the present invention has been found to yield improved catalyst performance at these metal loadings.

The dispersing agent can also be selected to promote the formation of catalyst particles that have a desired stability, size and/or uniformity. For example, the dispersing agent can be selected to promote formation of nanoparticle catalysts with a desired (110) or (111) crystal face exposure.

In a preferred embodiment, the dispersing agent is selected to form catalyst particles with a (110) crystal face exposure for manufacturing hydrogen peroxide. An example of a suitable dispersing agent for forming nanoparticles with selective (110) crystal face exposure is polyacrylic acid having a molecular weight of about 1200 MW and minimal or no branching.

IV. Methods of Manufacturing Hydrogen Peroxide

The supported catalysts of the present invention are particularly advantageous for the direct synthesis of hydrogen peroxide from hydrogen and oxygen. In a preferred embodiment, hydrogen peroxide promoting catalysts manufactured according to the present invention include a combination of palladium and platinum. In addition, the catalyst nanoparticles can be controllably formed to have a (110) crystal face exposure. Suitable dispersing agents for producing catalyst nanoparticles with a (110) crystal face exposure include linear polymers or oligomers, such as lower molecular weight polyacrylic acid. (e.g., between about 300 to about 15,000 Daltons).

The catalysts of the present invention can be used in any type of reactor suitable for the direct synthesis of hydrogen peroxide. Suitable reactors include fixed bed, ebullated bed, and slurry reactors. In a preferred embodiment, the catalysts of the present invention are loaded into a fixed bed or ebullated bed reactor for hydrogen peroxide production. The use of the catalysts of the present invention in a fixed bed or ebullated bed reactor facilitates the recovery and regeneration of the catalyst.

To load the catalysts in a fixed bed or ebullated bed reactor, the supported catalysts are manufactured to have a size and/or shape suitable for a fixed bed or ebullated bed. For example, the supported catalysts can be manufactured into particulates such as beads or spheres that have a size suitable for use in a fixed bed or fluidized bed reactor. In an exemplary embodiment, the particulate has a nominal dimension of at least about 0.5 mm, and more preferably at least about 1 mm. Alternatively, the support material can be extruded to make a part with dimensions that are suitable for use in any size or shaped fixed bed reactor.

Extruding, crushing or otherwise shaping the support material for use in a particular type of reactor is typically done before anchoring the catalyst onto the support material such that the catalyst is distributed over substantially the entire support surface that is exposed in the reactor.

Once the supported catalyst is placed into a suitable reactor, hydrogen peroxide can be directly synthesized by introducing a feedstream of hydrogen gas and molecular oxygen. In an exemplary embodiment, hydrogen is introduced into the reactor in a concentration less than the flammability limit of hydrogen. The oxygen concentration preferably ranges from about 5% to about 97% by volume, more preferably from about 10% to about 80%, and most preferably from about 20% to about 60%. For concentrations of oxygen greater than about 25%, it is advantageous to use an inorganic support to avoid oxidation of the support.

The supported catalysts of the present invention have metal loadings and suitable activity for the efficient production of hydrogen peroxide at low hydrogen concentrations. Because the metal component of the catalyst material is anchored to the support material, the supported catalysts have extended life and are easily recovered and regenerated. For reactors such as fixed bed and fluidized bed reactors, the supported catalysts are particularly easy to recover, thereby reducing ongoing cost of hydrogen peroxide production.

The following examples are exemplary procedures for manufacturing supported catalyst according to the present invention and for manufacturing hydrogen peroxide using these catalysts.

Example 1

Preparation of Acid-Functionalized Support Material

Example 1 describes a method for manufacturing an acid-functionalized support material according to the present invention. The support material used was silica gel (Grade 57 silica gel beads supplied by PlusPharma). Without any prior treatment, the as-supplied silica gel beads were combined with a sufficient quantity of concentrated sulfuric acid (Technical grade, 93-98% $H_2SO_4$) to completely cover the solid. Based on the composition specification for the sulfuric acid, the concentration of water in the liquid phase was 7 wt % or less. The mixture was then heated to a temperature of 250° C., where it was held for a period of three days. The mixture was then allowed to cool to a temperature below 100° C. The acid was then drained, and a series of washes were conducted using deionized water, which was added to cover the solid, allowed to soak for a brief period, and then drained. Water washes were repeated until the wash water drained from the solid had a pH of approximately 2. At this point the wet solid was ready for deposition of catalytic metals.

Example 2

Preparation of Nanoparticle Colloid

Example 2 describes a method of making a nanoparticle colloid suitable for use with the acid-functionalized support material of Example 1. An aqueous solution of $PdCl_2$ containing 14.34% (w/w) palladium and 7.13% (w/w) free acid (as HCl) was used as the palladium source. A platinum solution (0.01 wt %) was prepared by mixing 0.2614 g $H_2PtCl_6$ with 1000 ml of deionized water. An organic dispersing agent solution (6.75 wt %) was prepared by diluting 15 g of 45 wt % polyacrylic acid sodium salt solution (MW ca. 1200) to a total weight of 100 g with deionized water. 2.508 g of the palladium solution, 72 ml of platinum solution and 60 ml of organic dispersing agent solution were mixed and then diluted to 600 ml with deionized water. The solution was purged for 2 hours with 100 cc/min nitrogen, and then purged with hydrogen for 16 hours. The nanoparticle colloid was then ready for use.

Example 3

Preparation of Supported Catalyst

Example 3 describes a method of preparing a supported catalyst using the acid-functionalized support material of Example 1 and the colloid of Example 2. An amount of acid-functionalized (wet) catalyst support equivalent to 20 g of original dry starting weight was combined with 100 ml of the nanoparticle colloid of Example 2. The mixture was then placed under an infra-red heat lamp and rotated continuously to evaporate the water until the solid was dry. The solid was then placed in a 90° C. oven overnight.

The nanoparticle-impregnated solid was then treated by hydrogen reduction. The solid was first placed under 100 cc/min nitrogen flow and held at 90° C. for 4 hours. Then the solid was placed under hydrogen flow at 100 cc/min, at which point the temperature was increased to 175° C., where it was held for 17 hours. The temperature was then lowered to 150° C. and the hydrogen was changed to nitrogen at 100 cc/min for 4 hours. After final cooling, the catalyst containing 0.3 wt % Pd was ready for use.

Example 4

Direct Synthesis of Hydrogen Peroxide

Example 4 describes the use of the catalyst of Example 3 in the direct synthesis of hydrogen peroxide. 3.422 g of the catalyst of Example 3 (containing 0.3 wt % Pd) was charged to a tubular fixed bed reactor with a nominal diameter of 0.5 inches. The tubular reactor was operated at a pressure of 750 psig, and maintained at an internal temperature of 35° C. The tubular reactor was fed continuously with 2000 sccm (standard cubic centimeters per minute) of a gas feed containing 3 vol % hydrogen, 40 vol % oxygen, and the balance inert gas. The reactor was also fed continuously with 36 cc/hr of a liquid feed containing 4 wt % water, 650 ppmw $H_2SO_4$, and 15 ppmw NaBr and the balance methanol. Gaseous and liquid effluents from the tubular reactor were collected continuously, and analyzed to obtain data on the amount of hydrogen converted and the amount of hydrogen peroxide generated. After 100 hours of continuous operation, the hydrogen conversion was determined to be 50%, the selectivity to hydrogen peroxide (based on hydrogen converted) to be 79%, and the productivity (grams of $H_2O_2$ produced per grams Pd per hour) to be 200 g $H_2O_2$/g Pd/hr.

Example 5

Preparation and Performance of Comparative Supported Catalyst

Example 5 describes the preparation and use of a comparative supported catalyst to make hydrogen peroxide. The acid functionalization was carried out using the same steps as Example 1, except that the as-received silica gel support material was first soaked in water. The excess water was then drained, leaving a silica solid that was saturated with water. Sufficient sulfuric acid (Technical grade, 93-98 wt %) was then added to fully cover the solvent. On a total liquid basis, the approximate concentration of water present in the mixture was 26 wt %. The mixture was then heated to 150° C. and held overnight. The mixture was then allowed to cool. Water washing of the treated support and further preparation procedures then followed according to the methods described in Examples 1-3.

Performance testing of the comparative catalyst for direct synthesis of hydrogen peroxide was conducted as described in Example 4. After 50 hours of continuous operation, the hydrogen conversion was 55%, the selectivity to hydrogen peroxide was 67%, and the productivity was 200 g $H_2O_2$/g Pd/hr.

As shown in Example 4, the optimized method of acid-functionalizing the support material according to the present invention resulted in a catalyst having 79% selectivity for hydrogen peroxide. Comparison Example 5, which included washing the support material without drying, resulted in a selectivity of only 67%. The performance results demonstrated a substantial improvement in selectivity for direct synthesis of hydrogen peroxide when the support is manufactured according to the present invention. In addition, during manufacture of the supported catalysts according to the methods of the present invention, there was noticeably less degradation of the support material as compared to a method where greater than 20% water was present.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a nanocatalyst having an improved number of acid functional groups on the surface of a metal-based support, comprising:
   (i) providing a catalyst support material comprising a metal;
   (ii) providing an acid treatment composition comprising at least one of a mineral acid or mineral acid derivative;
   (iii) functionalizing the surface of the support material by mixing the acid treatment composition with the catalyst support material to react the support material with the mineral acid or derivative, wherein during the reaction, the amount of water in the acid treatment composition is less than about 20% by weight and the amount of mineral acid or mineral acid derivative in the acid treatment composition is greater than about 80% by weight; and
   (iv) forming a plurality of catalyst particles by reacting a plurality of organic dispersing agent molecules with a plurality of catalyst atoms; and
   (v) thereafter supporting the plurality of catalyst particles on the acid-functionalized support material.

2. A method as in claim 1, wherein the acid treatment composition comprises less than about 15% by weight water.

3. A method as in claim 1, wherein the acid treatment composition comprises less than about 10% by weight water.

4. A method as in claim 1, wherein the acid treatment composition comprises less than about 5% by weight water.

5. A method as in claim 1, wherein the acid treatment composition comprises sulfuric acid having a concentration of $H_2SO_4$ greater than about 80%.

6. A method as in claim 1, wherein the acid treatment composition comprises sulfuric acid having a concentration of $H_2SO_4$ greater than about 87%.

7. A method as in claim 1, wherein the acid treatment composition comprises sulfuric acid having a concentration of $H_2SO_4$ greater than about 93%.

8. A method as in claim 1, where the reaction temperature is greater than 100° C. during step (iii).

9. A method as in claim 1, where the reaction temperature is greater than 125° C. during step (iii).

10. A method as in claim 1, where the reaction temperature is greater than 150° C. during step (iii).

11. A method as in claim 1, wherein reaction pressure is greater than 1.1 MPa.

12. A method as in claim 1, wherein step (v) comprises providing the catalyst particles as a colloidal solution having at least about 200 ppm catalyst atoms by weight.

13. A method as in claim 1, wherein step (v) comprises providing the catalyst particles as a colloidal solution having at least about 250 ppm catalyst atoms by weight.

14. A method as in claim 1, wherein the metal loading of the catalyst particles on the support material is greater than about 0.2 wt %.

15. A method as in claim 1, wherein the metal loading of the catalyst particles on the support material is greater than about 0.3 wt %.

16. A supported catalyst manufactured according to the method of claim 1.

17. A method of manufacturing hydrogen peroxide, comprising:
   placing the supported catalyst of claim 16 in a reactor; and
   introducing a hydrogen feedstream and an oxygen feedstream into the reactor under conditions suitable for catalyzing the production of hydrogen peroxide using the supported catalyst.

18. A method for manufacturing a supported nanocatalyst comprising:
   (i) providing a catalyst support material comprising a metal;
   (ii) providing an acid treatment composition comprising at least one of a mineral acid or mineral acid derivative;
   (iii) functionalizing the surface of the support material by mixing the acid treatment composition with the catalyst support material and reacting the support material with the mineral acid or derivative, wherein during the reaction, the amount of water in the acid treatment composition is less than about 20% by weight, the amount of mineral acid or mineral acid derivative in the acid treatment composition is greater than about 80% by weight, and the reaction temperature is greater than about 100° C.;
(iv) reacting a plurality of dispersing agent molecules with a plurality of catalyst atoms to form catalyst nanoparticles; and
(v) supporting the catalyst nanoparticles on the acid-functionalized support material.

19. A method as in claim 18, wherein the amount of water in the acid treatment composition is less than about 10% by weight during step (iii).

20. A method as in claim 18, wherein the mineral acid or derivative comprises $H_2SO_4$ in a concentration of at least about 80 wt %.

21. A method as in claim 18, wherein the dispersing agent comprises polyacrylic acid.

22. A method as in claim 18, wherein the support material comprises one or more of silica, alumina, or zeolites.

23. A method as in claim 18, wherein the support material is shaped into one of granules, beads, spheres, extrudates, or a combination thereof.

24. A supported catalyst manufactured according to the method of claim 18.

25. A method of manufacturing hydrogen peroxide, comprising:
    placing the supported catalyst of claim 24 in a fixed bed or ebullated bed reactor; and
    introducing a hydrogen feedstream and an oxygen feedstream into the reactor under conditions suitable for catalyzing the production of hydrogen peroxide using the supported catalyst.

26. A method for manufacturing a supported nanocatalyst comprising:
    (i) preparing an acid-functionalized support material by:
        providing a catalyst support material comprising a metal;
        providing an acid treatment composition comprising a mineral acid or mineral acid derivative having a concentration of at least about 80% by weight of the acid treatment composition; and
        reacting the acid treatment composition with the support material at a temperature of at least about 100° C. to yield the acid-functionalized support material; and
    (ii) preparing a supported nanocatalyst by:
        providing a plurality of catalyst atoms;
        providing a dispersing agent comprising a plurality of organic molecules having at least one functional group capable of binding to the catalyst atoms; and
        reacting the dispersing agent, the catalyst atoms, and the acid-functionalized support material in a single reaction vessel to form a plurality of catalyst particles, wherein the catalyst atoms are supported on the acid-functionalized support material.

27. A method as in claim 26, wherein the dispersing agent comprises polyacrylic acid.

28. A method as in claim 26, wherein the dispersing agent bonds to acid functional groups on the acid-functionalized support material to anchor the catalyst particles thereto.

29. A method as in claim 26, wherein the mineral acid or derivative comprises sulfuric acid.

30. A method as in claim 1, where the acid treatment composition is reacted with the support material at a temperature of at least about 150° C.

31. A method as in claim 26, wherein the mineral acid or derivative comprises less than about 20% water during the reaction with the support material.

32. A method as in claim 25, wherein the acid treatment composition comprises less than about 10% water during the reaction with the support material.

33. A supported catalyst manufactured using the method of claim 32.

* * * * *

UNITED STATES PATENT AND TRADEMARK OFFICE
CERTIFICATE OF CORRECTION

PATENT NO. : 7,632,774 B2
APPLICATION NO. : 11/393334
DATED : December 15, 2009
INVENTOR(S) : Rueter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Second Day of November, 2010

David J. Kappos
*Director of the United States Patent and Trademark Office*